(12) United States Patent
Wu et al.

(10) Patent No.: US 11,573,120 B2
(45) Date of Patent: Feb. 7, 2023

(54) METHOD FOR ADJUSTING PARAMETERS OF A DEVICE HAVING A WEIGHING SENSOR

(71) Applicants: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

(72) Inventors: Jianwei Wu, Zhangzhou (CN); Jean-Christophe Emery, Zhangzhou (CN)

(73) Assignees: Mettler-Toledo (Changzhou) Precision instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 221 days.

(21) Appl. No.: 16/949,316

(22) Filed: Oct. 26, 2020

(65) Prior Publication Data
US 2021/0123794 A1    Apr. 29, 2021

(30) Foreign Application Priority Data
Oct. 25, 2019    (CN) .......................... 201911024139.9

(51) Int. Cl.
*G01G 23/00* (2006.01)
*G01G 19/08* (2006.01)
*G01N 5/04* (2006.01)

(52) U.S. Cl.
CPC .............. *G01G 23/00* (2013.01); *G01G 19/08* (2013.01); *G01N 5/045* (2013.01)

(58) Field of Classification Search
CPC ........ G01G 23/01; G01G 23/00; G01G 19/08; G01N 5/045
See application file for complete search history.

(56) References Cited

U.S. PATENT DOCUMENTS

| 6,215,078 B1 * | 4/2001 | Torres ................ G01G 19/4144 |
| | | 235/383 |
| 10,393,570 B2 * | 8/2019 | Esser ...................... B01L 3/021 |

(Continued)

FOREIGN PATENT DOCUMENTS

| CN | 107144601 A | 9/2017 |
| JP | S52-89963 A | 7/1977 |

(Continued)

*Primary Examiner* — Randy W Gibson
(74) *Attorney, Agent, or Firm* — Standley Law Group LLP; Jeffrey S. Standley; Adam J. Smith

(57) ABSTRACT

A method for adjusting parameters of a device with a weighing sensor collecting environmental parameter data of an environment where the device is currently located or environmental parameter data during execution of an application by the device. A zero compensation parameter is calculated and updated, based on the data collected. The method is applicable to a moisture analyzer and also to a vehicle scale. In the moisture analyzer, the method is triggered and executed in the analyzer, correcting the zero compensation data by using the environmental parameter data of an environment or environmental parameter data during execution of an application by the analyzer. Dynamic and real-time adjustment of a compensation parameter overcomes the problem that the scheme of pre-setting fixed parameters for zero compensation cannot deal with the complex zero drift encountered in actual environments.

20 Claims, 2 Drawing Sheets

(56) References Cited

U.S. PATENT DOCUMENTS

| | | | |
|---|---|---|---|
| 2007/0007050 A1* | 1/2007 | Reber | G01G 23/01 177/212 |
| 2007/0073505 A1* | 3/2007 | Bliss | G01G 23/01 73/1.13 |
| 2012/0051391 A1 | 3/2012 | Bourg, Jr. et al. | |
| 2016/0252389 A1* | 9/2016 | Esser | G01G 19/303 177/25.13 |

FOREIGN PATENT DOCUMENTS

| KR | 2003-0084402 A | 11/2003 |
|---|---|---|
| WO | 2019/134524 A1 | 7/2019 |

\* cited by examiner

METHOD FOR ADJUSTING PARAMETERS OF A DEVICE HAVING A WEIGHING SENSOR

CROSS-REFERENCE TO RELATED APPLICATIONS

This application is a non-provisional application that claims priority to Chinese patent application CN 201911024139.9 of 25 Oct. 2019, which is incorporated by reference as if fully recited herein.

TECHNICAL FIELD

The present invention relates to a method for adjusting parameters of a device having a weighing sensor and to a storage medium for executing the method.

BACKGROUND OF THE ART

Environmental factors such as temperature may cause zero drift of weighing sensors, which affects the accuracy of weight weighing of devices installed with weighing sensors. At present, in order to compensate for the zero drift, fixed compensation values are generally stored in the devices, and weighing data is corrected by the compensation values while the devices output the weighing data, thereby overcoming the influence of the zero drift on the accuracy of the weighing data.

For example, truck scales, also known as weighbridges, are main weighing devices used in factories and mines or by merchants etc. for the measurement of bulk goods. However, the actual application environments for the truck scales are relatively harsh, complicated and diverse. For some application scenarios, the temperature difference between day and night is very large, which is more than 20° C., and the temperature gradient varies greatly, which leads to a large drift of the zero of scale platforms, thereby affecting the accurate weighing. In addition, the change in the external humidity will also affect the zero. If the sensor without a welded seal is exposed to the humid environment for a long time, it will cause zero drift, which will affect the accuracy of the weighing.

Although the use of digital sensors can achieve functions such as temperature compensation, the existing compensation methods can only be used for static compensation, for example, only for static temperature compensation, and cannot compensate for zero changes at dynamic temperatures. Moreover, the truck scale is a multi-point application, that is, various weighing sensors are installed at different positions of the scale platform, and changes in the external temperature reflect different temperature gradients on the various sensors, some of which are on the sunny side so that the temperature gradient changes greatly, and some of which are on the shady side so that the temperature gradient is relatively small, and therefore, a zero change curve also varies from sensor to sensor. Therefore, the complexity and variability of the actual environment causes the zero curve to change all the time. The fixed parameters obviously cannot dynamically adjust the zero curve in the changing environment.

In addition, moisture meters use the principle of thermogravimetric analysis to record the initial mass of a sample, then heats the sample, and calculates the moisture content of the sample from the total mass loss of the sample recorded by an internally integrated scale.

For the moisture meters, during the heating process, part of the heat is transferred to weighing sensors through scale trays, which will causes the zero drift of the weighing sensors; and when the heating is stopped, the phenomenon of zero drift will also appear in the weighing sensors. The zero drift will cause the deviation of the moisture measurement of the final measured object, which directly affects the accurate weighing.

For the zero drift of the moisture meters, in the prior art, pre-calculated or -set fixed compensation parameters are recorded in a non-volatile storage device, so that during the heating process, appropriate compensation parameters are selected to compensate for the zero.

However, the heating time and the heating temperature range of the moisture meters are different, and the variation characteristics of the zero will also change accordingly. For example, for the samples with relatively large moisture and relatively large mass, the heating time will be relatively long and the heating temperature will be relatively high; and for the samples with relatively small moisture and relatively small mass, the heating time will be relatively short and the heating temperature does not need to be set very high. For these changes, the changing zero characteristic curve cannot be satisfied by the zero compensation only with the fixed parameters recorded in advance, and the performance improvement cannot be guaranteed; furthermore, changes in external environmental factors such as the humidity will also directly affect the zero change curve. A variety of influencing factors are interleaved, which causes the failure of the scheme of pre-setting fixed parameters for zero compensation.

It can be seen that, for devices equipped with and using weighing sensors, there is an urgent need for a method capable of compensating for zero drift caused by dynamic environmental factors such as temperature and humidity.

The technical problem solved herein is: in order to solve the problem in the prior art that the scheme of pre-setting fixed parameters for zero compensation is unable to deal with the complex zero drift caused by variable heating conditions and actual environments, to provide a zero parameter adjustment method for a device with a weighing sensor and a storage medium, in which by dynamically adjusting a compensation parameter in real time, the zero change curve is better fitted to ensure high-accuracy measurement.

SUMMARY

The present invention solves the above technical problem by the following technical solutions: the present invention provides a method for adjusting parameters of a device having a weighing sensor, which is characterized in that the device triggers and executes the following method comprising the steps of: collecting, during execution of an application by the device, environmental parameter data of an environment where the device is currently located or environmental parameter data; and calculating and updating a zero compensation parameter of the device based on the environmental parameter data collected from the current time to the last update time of the zero compensation parameter in the device or the environmental parameter data collected during the execution of the application.

The zero drifts of the device for the environment temperature change of 5° C. and the temperature change of 15° C. are different, so there definitely exists differences in compensation parameters. The present invention dynamically corrects zero compensation data based on the state of the environment where the actual device is located and the extent to which the environment changes during the execution of an application by the device, so as to ensures the accuracy of the weighing application in the device.

At the same time, by means of triggering, the zero compensation data can be corrected in a specified state such as an idle state, thereby avoiding an influence on the execution of the application by the device.

Preferably, the zero compensation parameter of the device is calculated and updated based on the environmental parameter data collected during the last execution of the application by the device, or the environmental parameter data collected during the execution of the application so as to calculate and update the zero compensation parameter.

In the present invention, the collected parameter of the environment where the device is located may be an environmental parameter after the application has been executed, which can quickly update and correct the zero compensation parameter, or also may be corresponding environmental parameter collected after the application is specifically executed again to correct the zero compensation parameter, so as to correct the zero compensation parameter more accurately.

Preferably, before updating the zero compensation parameter in the device, when the device fails to perform a performance verification test, then the method is ended; or, after updating the zero compensation parameter in the device, when the device fails to perform a performance verification test, then the zero compensation parameter is restored to a state before updating.

The present invention further performs a performance verification after the parameter adjustment, and upon a verification failure, restores the parameter to a state before updating as early as possible to prevent degradation of the performance.

Preferably, the method is triggered and executed when the device is in an idle state; or the method is triggered and executed when the device is in an idle state and at least one of the following situations occur: the time exceeds a pre-set threshold; a change in at least one parameter of the environment where the device is located exceeds a pre-set threshold; the time passed since the last update of the zero compensation parameter in the device or the amount of applications executed by the device exceeds a pre-set threshold.

In the present invention, when the device is in an idle state, the zero parameter of the device is adjusted, so that the execution of the application by the device is not affected. The idle state refers to a state in which the main application function of the device does not execute or waits for execution. Moreover, in the present invention, the method can also be triggered depending on different situations, such that the zero parameter is adjusted more accurately and in a timely manner. The idle state of the device means that the device does not execute or waits to execute its main function.

Preferably, the environmental parameter data comprises at least one of temperature, humidity, or atmospheric pressure.

The present invention provides a method for a moisture analyzer, which is characterized in that the following method is triggered and executed in the moisture analyzer: the moisture analyzer performing heating according to a pre-set heating temperature and heating time, and collecting a zero weight of the moisture analyzer, the temperature of a heating lamp tube, and environmental parameter data during the heating process and/or a heat dissipation process; and calculating a zero compensation parameter based on the zero weight and the environmental parameter data, and updating the zero compensation parameter in the moisture analyzer.

The method in the present invention is triggered and executed in a specific manner in the moisture analyzer, so that the zero compensation parameter in the moisture analyzer can be timely corrected according to the state of the environment where the moisture analyzer is located, the heating temperature and time, etc. while using a thermogravimetric analysis application to analyze the moisture of a sample without affecting the normal use of the moisture analyzer, thereby ensuring high measurement accuracy. The thermogravimetric analysis application refers to a procedure or method performed by existing moisture meters for detecting the moisture of the sample.

The heating process in the present invention refers to a process during which the moisture analyzer first starts to heat, then performs heating, and finally stops heating. The heat dissipation process refers to a process during which the moisture analyzer returns to the indoor temperature after the moisture analyzer stops heating.

The environmental parameter data of the present invention refers to parameter data of an environment where the moisture analyzer is located, such as the room temperature and the air humidity in the room, and may also be parameter data of the environment where a weighing sensor is located in the moisture analyzer.

Preferably, the zero weight of the moisture analyzer, the temperature of the heating lamp tube, and the environmental parameter data during the heating process and/or the heat dissipation process are collected at a pre-set time interval.

Preferably, the zero weight of the moisture analyzer, the temperature of the heating lamp tube, and the environmental parameter data during the heating process are collected at a pre-set heating time interval; and the zero weight of the moisture analyzer, the temperature of the heating lamp tube, and the environmental parameter data during the heat dissipation process are collected at a pre-set heat dissipation time interval.

The present invention can adjust the quantity of collected data by setting the time interval, and the more the number of collections, the higher the parameter adjustment accuracy.

Preferably, if the time for the heat dissipation process is less than the time for the heating process, when the zero weight of the moisture analyzer, the temperature of the heating lamp tube, and the environmental parameter data are collected during the heat dissipation process, then the time for collecting the zero weight of the moisture analyzer, the temperature of the heating lamp tube, and the environmental parameter data is prolonged to be the same as the time for the heating process.

In the present invention, if the heat dissipation time is less than the heating time, when collecting various data of the moisture analyzer during the heat dissipation process, the collection time is prolonged to be the same as the heating time, thereby ensuring the same data collected during the heating process and the heat dissipation process, and avoiding the influence of data quantity on the calculation of the zero compensation parameter.

Preferably, if changes in the environmental parameter data collected by the moisture analyzer during the heating process and the heat dissipation process exceed a pre-set threshold, the method is ended.

In the present invention, when the state of the environment where the moisture analyzer is located is abnormal and the state of the environment is unstable, the zero compensation parameter cannot be effectively calculated at this time, so that the method is exited. Erroneously updating the zero compensation parameter should be avoided.

Preferably, before updating the zero compensation parameter in the moisture analyzer, when the moisture analyzer fails to perform a performance verification test, the method is ended; or, after updating the zero compensation parameter in the moisture analyzer, when the moisture analyzer fails to perform a performance verification test, then the zero compensation parameter is restored to a state before updating.

In order to improve the stability of zero compensation parameter adjustment to the performance of the moisture analyzer, the present invention further performs a performance verification after the parameter adjustment, and upon a verification failure, the parameter is restored to a state before updating as early as possible to prevent degradation of the performance of the moisture analyzer.

Preferably, the method is triggered and executed when the moisture analyzer is in an idle state; or the method is triggered and executed when the moisture analyzer is in an idle state and at least one of the following situations occur: the time exceeds a pre-set threshold; a change in at least one parameter of the environment where the moisture analyzer is located exceeds a pre-set threshold; the time passed since the last update of the zero compensation parameter in the moisture analyzer or the amount of thermogravimetric analyses performed by the moisture analyzer exceeds a pre-set threshold.

In the present invention, the parameter adjustment procedure can be triggered depending on different situations, such that the zero parameter is adjusted more accurately and in a timely manner.

Preferably, the environmental parameter data comprises at least one of temperature, humidity, or atmospheric pressure.

The present invention further provides a method for a vehicle scale, which is characterized in that the following method is triggered and executed in the vehicle scale: collecting environmental parameter data of an environment where the vehicle scale is currently located; calculating and updating a zero compensation parameter of the vehicle scale based on the environmental parameter data and environmental parameter data at the last update time of the zero compensation parameter of the vehicle scale; or, calculating and updating the zero compensation parameter of the vehicle scale from the environmental parameter data collected within a time interval from the last update of the zero compensation parameter to the triggering of the method.

In the present invention, when the environmental parameters of the vehicle scale change greatly, the zero compensation parameter is corrected by collecting the environmental parameters. When the parameter adjustment procedure is triggered, the zero compensation parameter is corrected based on the environmental data at the time of last parameter correction, the environmental data at the time of triggering, or the environmental parameters within the time interval between the two parameter corrections.

Preferably, the vehicle scale further collects zero information, and when a change between the zero information and zero information upon the last update of the zero compensation parameter of the vehicle scale is within a pre-set threshold, the method is ended.

Preferably, when a change in the environmental parameter data collected within the time interval is within a pre-set threshold, the method is ended.

In the present invention, after triggering the method, it is determined whether the compensation accuracy is still within an acceptable error range based on zero information, etc., and whether the method is ended or is performed.

Preferably, the method is triggered and executed when the vehicle scale is in an idle state; or the method is triggered and executed when the vehicle scale is in an idle state and at least one of the following situations occur: the time exceeds a pre-set threshold; a change in at least one parameter of the environment where the vehicle scale is located exceeds a pre-set threshold; the time passed since the last update of the zero compensation parameter in the vehicle scale or the amount of weighing applications executed by the vehicle scale exceeds a pre-set threshold.

In the present invention, the parameter adjustment procedure can be triggered depending on different situations, such that the zero parameter is adjusted more accurately and in a timely manner.

Preferably, the environment parameter data comprises at least one of temperature, humidity, or atmospheric pressure.

Preferably, before updating the zero compensation parameter in the vehicle scale, when the vehicle scale fails to perform a performance verification test, then the method is ended; or, after updating the zero compensation parameter in the vehicle scale, when the vehicle scale fails to perform a performance verification test, then the zero compensation parameter is restored to a state before updating.

In order to improve the stability of zero compensation parameter adjustment to the performance of the vehicle scale, the present invention further performs a performance verification after the parameter adjustment, and upon a verification failure, the parameter is restored to a state before updating as early as possible to prevent degradation of the performance of the vehicle scale.

The present invention further provides a storage medium, characterized in that the storage medium comprises a stored program, wherein the program, when running, controls an apparatus in which the storage medium is located to execute the method as mentioned above.

The positive and progressive effects of the present invention are as follows: in the present invention, by utilizing dynamic and real-time adjustment of a compensation parameter, the measurement accuracy of the weighing sensor in the device is improved.

The zero drift is overcome, which is caused by the harsh environment where the truck scale is located, realizing the high-accuracy weighing. The moisture measurement error is also overcome, which is caused by the change of zero curve in the heating process, which results from changes in the heating time and temperature for different samples and a change in the environment such as the temperature and the humidity in the moisture analyzer.

BRIEF DESCRIPTION OF THE DRAWINGS

The present invention further utilizes means of verifying the accuracy of the parameter adjustment and the like, thereby avoiding the occurrence of a situation where the parameter adjustment causes degradation of the performance.

DETAILED DESCRIPTION OF THE DRAWINGS

The present invention is further illustrated below by way of embodiments, but is not thus limited within the scope of the embodiments.

The method for adjusting zero parameters provided by the present invention and the application using the weighing sensor in the device are simultaneously online, and when the application of the weighing sensor in the device is in an idle state, that is, the application of the weighing sensor does not perform tasks such as weighing, the changes in the temperature and other parameters affecting the zero are analyzed, and the zero parameter of the weighing sensor is adjusted, so that the performance of the application of the weighing sensor in the device is not degraded due to the change in the state of the environment, so the accuracy of the application of the weighing sensor is improved.

The zero parameter adjustment method and the thermogravimetric analysis application for the sample in the moisture analyzer are simultaneously online, and the method is performed in the idle time of the moisture analyzer, that is, the method is performed while the thermogravimetric analysis application waits for running, so that the zero compensation parameter of the moisture analyzer can be intelligently adjusted according to the state of the environment, the change of zero in the thermogravimetric analysis process and the zero parameter correction period, so as to ensure the high accuracy of moisture detection for the sample. At the same time, the influence on the thermogravimetric analysis application is avoided.

The zero parameter adjustment method and the weighing application in the vehicle scale are simultaneously online, and when the device is in idle, the method is performed, so that the performance of the zero does not change in a changing environment, thereby ensuring high-accuracy measurement of the truck scale.

By way of the embodiments as described below, the implementations of the present invention are illustrated by way of examples.

Figure 1:
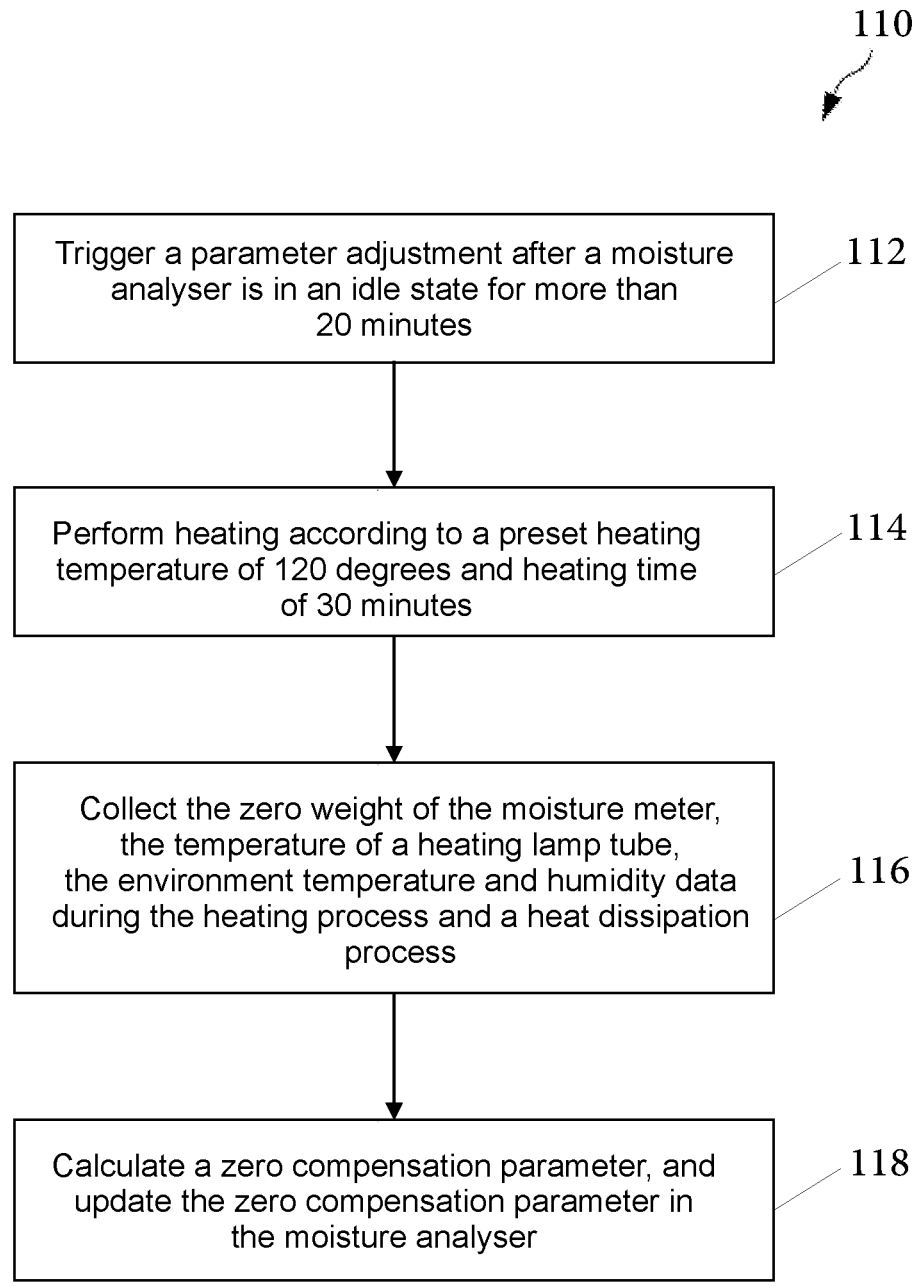
FIG. 1 is a flow chart of zero parameter adjustment in one embodiment of the present invention.

In a moisture analyzer that executes a parameter adjustment method of an embodiment 110 shown in FIG. 1, the thermogravimetric analysis application is in an online state, and the heating and weighing operations can be performed at any time. After the moisture analyzer of this embodiment is in an idle state for more than 20 minutes, as in step 112, the moisture analyzer triggers the following method, as seen at step 114: the moisture analyzer performs heating according to a pre-set heating temperature of 120° C. and heating time of 30 minutes, and collects, as seen at step 116, the zero weight of the moisture analyzer, the temperature of a heating lamp tube, and environment temperature and humidity data during the heating process and a heat dissipation process. At present, the heating lamp tube of the moisture analyzer has a rapid heating rate, and the temperature is generally raised to a pre-set heating temperature in about 10 seconds.

Specifically, in this embodiment, the zero weight of the moisture analyzer, the temperature of the heating lamp tube, and the environment temperature and humidity data are collected, at an interval of 5 minutes, at various time points from the time before heating to the time when the heating is stopped.

During the process of stopping the heating and the temperature of the heating lamp tube returning back to the room temperature, the zero weight of the moisture analyzer, the temperature of the heating lamp tube, and the environment temperature and humidity data are also collected, at an interval of 5 minutes, at various time points during the heat dissipation process.

In another embodiment, if the time for the temperature of the heating lamp tube returning back to the room temperature is shorter than the heating time, the zero weight of the moisture analyzer, the temperature of the heating lamp tube, and the environment temperature and humidity data are collected at various time points according to the length of the heating time.

In another variant, when the moisture analyzer is in an idle state, and the environment such as the humidity or the temperature changes, the moisture analyzer performs the above method; or when the moisture analyzer is in the idle state for more than 10 minutes and the change in at least one environmental factors such as the humidity and the temperature exceeds a threshold, for example, when the change in the temperature exceeds 10° C. or the change in the humidity exceeds 20%, the moisture analyzer performs the above method.

In still another variant, when the moisture analyzer is in an idle state, and the time since the last update of the zero compensation parameter exceeds a threshold, e.g. 1 week, the above method is triggered and executed; or, the above method is manually triggered and executed. In another embodiment, when the amount of thermogravimetric analyses performed by the moisture analyzer exceeds a pre-set threshold, such as 20, the above method is triggered and executed.

The zero compensation parameter is calculated at step 118 from the zero weight, and the environment temperature and humidity data, and the zero compensation parameter in the moisture analyzer is updated.

The zero compensation parameter P is calculated as follows:

$$P = f\left(1, \sum_{i=1,2,3\ldots} \exp\left(\frac{-t}{\tau_i}\right), W\right)$$

where $\tau_i$ is a time constant, W is the collected zero weight, and t is the collection time point.

In another variant embodiment, only the relevant parameters of the moisture analyzer during the heating process are collected. Moreover, the above calculation and updating of the zero compensation parameter are carried out.

In another embodiment, it is detected whether there is an abnormality in the environment temperature and humidity data, for example, the changes in the environmental factors such as the temperature, the humidity and the atmospheric pressure are excessively large, exceeding a set range. This indicates that the state of the environment is unstable. At this time, the calculated zero compensation parameter is invalid or the zero compensation parameter is no longer calculated, and the parameter adjustment method is exited, waiting for the next parameter adjustment.

In still another embodiment, prior to updating the zero compensation parameter in the moisture analyzer, the moisture analyzer performs a verification test procedure, performs heating according to a pre-set test heating temperature and heating time, and collects the zero weight during the heating process and heat dissipation process. The performance of the moisture analyzer is verified, and the zero compensation parameter after updating of the moisture analyzer is calculated to determine whether same exceeds a change threshold of zero compensation of the zero compensation parameter before updating. If exceeded with regard to the performance, the zero compensation parameter is updated, and if not exceeded, the zero compensation parameter is not updated.

In another variant of the embodiment in which the performance of the moisture analyzer is verified, the zero compensation parameter in the moisture analyzer is preferentially updated, then the verification test procedure of the moisture analyzer is executed, and if the performance of the zero compensation parameter is degraded after updating, the zero compensation parameter in the moisture analyzer is rolled back, and the zero compensation parameter in the moisture analyzer is restored to the state before updating. Therefore, the performance degradation caused by the update is avoided.

In an embodiment similar to the embodiment shown in FIG. 1, the detected temperature of the weighing sensor in the moisture analyzer and the surrounding humidity, atmospheric pressure, etc. are used as the temperature, the humidity, the atmospheric pressure and other data of the environment to calculate the adjustment zero compensation parameter.

Figure 2:
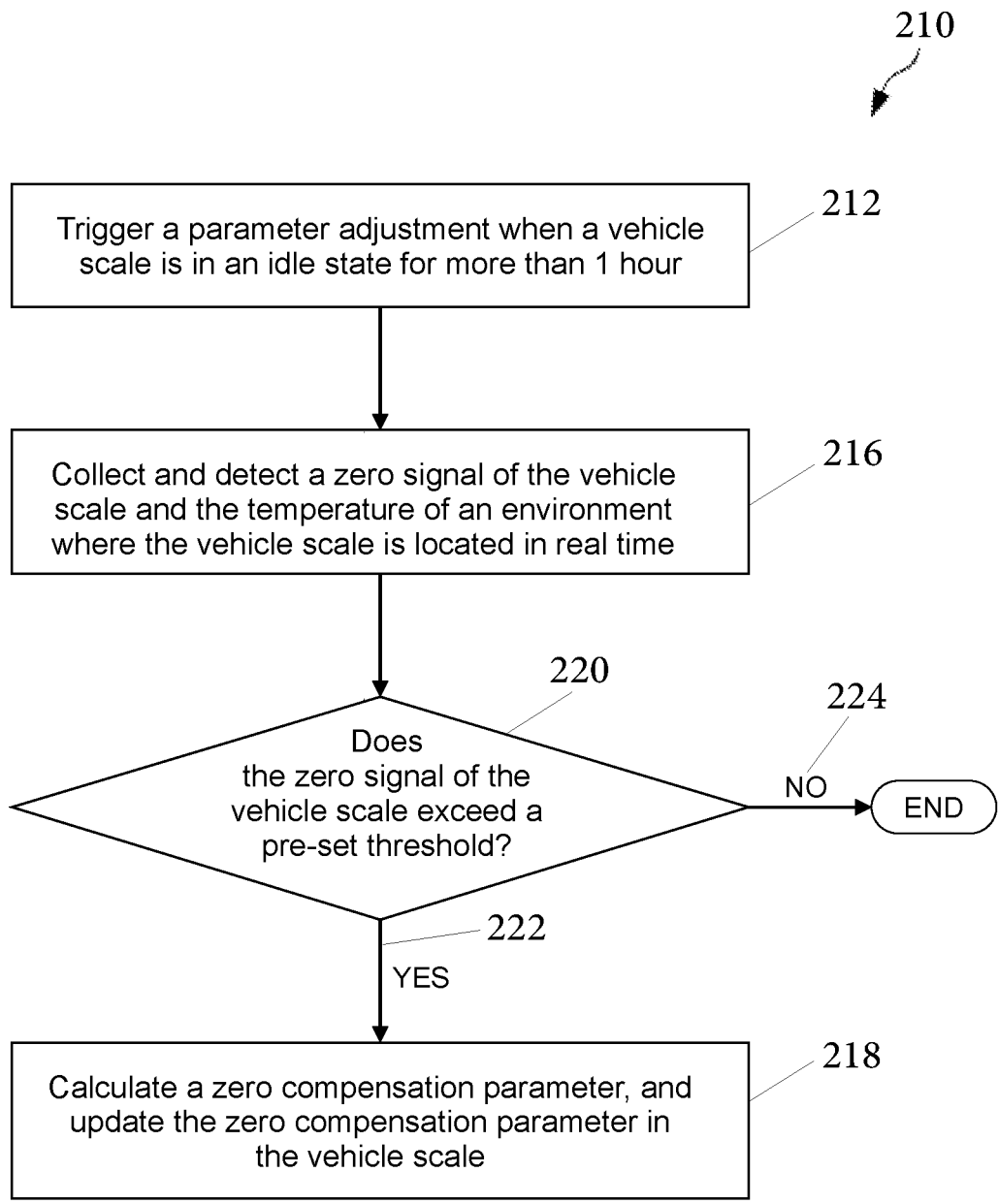
FIG. 2 is a flow chart of zero parameter adjustment in another embodiment of the present invention.

In an embodiment 210 of a truck scale parameter adjustment shown in FIG. 2, a digital sensor of the vehicle scale constitutes an existing typical Wheatstone bridge, and a nickel foil or a PT resistor (thermistor) is used as a temperature detection sensor and is connected in series in the bridge to achieve static temperature compensation for the sensor.

The relationship between the temperature change and the weight change in the application environment where the truck scale is located can be summarized as a differential relationship. Therefore, by using this differential relationship, a temperature compensation model is established to calculate a compensation temperature compensation model.

In another embodiment, in the case of having a large amount of prior data, the temperature compensation model may even use a list of, or a function curve of, temperature and compensation parameters composed of the prior data.

In this embodiment, the weighing application of the vehicle scale is in an online state, and the operation of weighing a vehicle can be performed at any time. In this embodiment, when the vehicle scale is in an idle state for more than 1 hour, the vehicle scale triggers, as at step 212, the following parameter adjustment method 216: zero signal of the vehicle scale is collected and detected in real time, while the temperature of the environment where the vehicle scale is located is collected.

When the zero signal of the vehicle scale and the zero signal recorded in the vehicle scale upon the last execution of parameter adjustment method exceed a pre-set threshold, as at 222 the collected environment temperature and the environment temperature at the last execution of the parameter adjustment method and the current zero compensation parameter are brought into the temperature compensation model, so as to obtain an updated zero compensation parameter, as at 218.

In another embodiment, the vehicle scale keeps collecting the environment temperature in real time, and when the parameter adjustment method is triggered, the environment temperature data within the time interval from the last execution of the parameter adjustment method to the time point of triggering are all brought into the temperature compensation model so as to calculate and update the zero compensation parameter. Further, the environment temperature data collected within the above time interval creates a temperature curve, and the zero compensation parameter is calculated and updated directly through the curve and the temperature compensation model.

In still another variant, the vehicle scale keeps collecting the environment temperature in real time to create a temperature curve, and within the above time interval, when the amplitude of change in the temperature curve is great, e.g. 20° C., the zero compensation parameter is calculated and updated, otherwise the change in the zero of the vehicle scale is within an error range, there is no need to adjust the zero compensation parameter, so the zero compensation method is directly ended, as at 224.

In another variant, when the vehicle scale is in an idle state, and the environment such as the humidity and the temperature changes, the vehicle scale performs above the parameter adjustment method; or when the vehicle scale is in an idle state for more than 30 minutes and the change in at least one environmental factors such as the humidity and the temperature exceeds a threshold, for example, when the change in the temperature exceeds 5° C. or the change in the humidity exceeds 40%, the vehicle scale performs the above parameter adjustment method.

In still another variant, when the vehicle scale is in an idle state, and the time since the last update of the zero compensation parameter exceeds a threshold, e.g. 3 days, the above parameter adjustment method is triggered and executed; or, the above parameter adjustment method is manually triggered and executed. In another embodiment, when the amount of weighing applications executed by the vehicle scale exceeds a pre-set threshold, such as 1000, the above parameter adjustment method is triggered and executed.

In another embodiment, when the difference between the environment temperature collected by the vehicle scale and the environment temperature recorded at the last execution of the parameter adjustment method exceeds a pre-set threshold, the collected environment temperature and the environment temperature at the last execution of the parameter adjustment method and the current zero compensation parameter are brought into the temperature compensation model, so as to obtain an updated zero compensation parameter.

In still another embodiment, the vehicle scale further detects the humidity of the environment where it is located, and other parameters that also affect the zero, and calculates and updates the zero compensation parameter according to the parameter updating method in the above embodiment when the change in the parameter such as the humidity exceeds the threshold.

In still another embodiment, before updating the zero compensation parameter of the vehicle scale, the performance of the vehicle scale is verified, and the zero compensation parameter after updating of the vehicle scale is calculated to determine whether same exceeds a change threshold of zero compensation of the zero compensation parameter before updating. If exceeded with regard to the performance, the zero compensation parameter is updated, and if not exceeded, the zero compensation parameter is not updated.

In another variant in which the performance is verified, first, the zero compensation parameter in the vehicle scale is updated, and the performance verification of the vehicle scale is then performed. When the performance of the zero compensation parameter is degraded after updating, the zero compensation parameter in the vehicle scale is rolled back, and the zero compensation parameter is restored to the state before updating. Therefore, the performance degradation caused by the update is avoided.

In this embodiment, the vehicle scale adjusts, through the online zero performance adjustment method, a zero change curve according to the change in the external temperature gradient, humidity or other parameters when the device is in idle, that is, when the weighing task is not executed or the scale platform is empty, so that the performance of the zero does not change in a changing environment, thereby ensuring high-accuracy measurement of the truck scale.

Through the above description of the parameter adjustment method, it can be clearly understood by those skilled in the art that the present invention can be implemented by means of software and necessary hardware platforms. Based on such understanding, the technical solutions of the present invention, essentially or for a contribution part in the prior art, can be embodied in the form of a software product, wherein the computer software product may be stored in a storage medium, comprising but not limited to a ROM/RAM (Read Only Memory/Random Access Memory), a magnetic disk, an optical disk, etc., and may comprise several instructions for causing one or more computer devices (which may be a personal computer, a server, or a network device, or the like) to perform the manner described in the various embodiments or in certain parts of the embodiments of the present invention.

The parameter adjustment method of the present invention may be described in the general context of the computer-executable instructions to be executed by a computer, such as a program module. Generally, the program module includes a program, an object, a component, a data structure, etc. that perform a particular task or implement a particular abstract data type. The present invention may also be practiced in distributed computing environments in which the tasks are executed by remote processing devices that are connected via a communications network. In the distributed computing environments, the program module may be located in local and remote computer storage media that include a storage device.

Moreover, in the present invention, a program module included in the parameter adjustment system may be further subdivided, integrated or re-divided according to the need for the deployment environment, hardware or software platform or the like of the apparatus or program module, in addition to the division manner as shown in the embodiments.

Although the specific implementations of the present invention are described above, a person skilled in the art should understand that these are only exemplary, and the scope of protection of the present invention is defined by the attached claims. A person skilled in the art can make various changes or modifications to these implementations without departing from the principle and spirit of the present invention, but all the changes or modifications fall within the scope of protection of the present invention.

What is claimed is:

1. A method for adjusting parameters of a moisture analyzer having a weighing sensor, wherein a program stored in a memory of the moisture analyzer triggers and executes the method, which comprises the steps of:
   collecting environmental parameter data by operating a heating cycle of the moisture analyzer according to a predetermined heating temperature and heating time, and collecting: a zero weight of the weighing sensor, a temperature of a heating lamp tube, and environmental parameter data during the heating cycle and, optionally, a heat dissipation cycle that follows, either during execution of an application by the moisture analyzer or of an environment where the moisture analyzer is currently located; and
   calculating a zero-compensation parameter of the moisture analyzer based on the zero weight and the collected environmental parameter data and updating a stored value of the zero-compensation parameter in the program.

2. The method according to claim 1, wherein the zero compensation parameter of the moisture analyzer is calculated and updated based on:
   the environmental parameter data collected during the last execution of the application by the moisture analyzer, or
   the environmental parameter data collected during the execution of the application.

3. The method of claim 1, wherein in the step of collecting environmental parameter data at least one of the following occurs:
   the zero weight of the weighing sensor, the temperature of the heating lamp tube, and the environmental parameter data are collected at a predetermined heating cycle time interval, and
   the zero weight of the weighing sensor, the temperature of the heating lamp tube, and the environmental parameter data during the heat dissipation cycle are collected at a predetermined heat dissipation time interval.

4. The method of claim 3, wherein if the time for the heat dissipation cycle is less than the time for the heating cycle, then the time for collecting the zero weight of the weighing sensor, the temperature of the heating lamp tube, and the environmental parameter data is prolonged to be the same as the time for the heating cycle.

5. The method of claim 3, wherein the method is terminated if changes in the environmental parameter data collected by the moisture analyzer during the heating cycle and the heat dissipation cycle exceed a predetermined threshold.

6. The method of claim 1, wherein the method is triggered and executed when the moisture analyzer is in an idle state and at least one of the following situations occurs:
   the time exceeds a determined threshold;
   a change in any one or more of parameters of the environment where the moisture analyzer is located exceeds a predetermined threshold;
   the time passed since the last update of the zero compensation parameter in the moisture analyzer exceeds a predetermined threshold;
   the number of times the moisture analyzer executes the application exceeds a predetermined threshold.

7. The method of claim 1, wherein the method is triggered and executed when the moisture analyzer is in an idle state.

8. The method of claim 1, wherein the method is triggered and executed when the moisture analyzer is in an idle state and at least one of the following situations occurs:
   the time exceeds a predetermined threshold;
   a change in at least one parameter of the environment where the moisture analyzer is located exceeds a predetermined threshold;
   the time passed since the last update of the zero compensation parameter in the moisture analyzer exceeds a predetermined threshold; or
   the number of thermogravimetric analyses performed by the moisture analyzer exceeds a predetermined threshold.

9. The method of claim 1, wherein:
   if the moisture analyzer fails to perform a performance verification test before updating the zero compensation parameter, then the method is terminated; or,
   if the moisture analyzer fails to perform a performance verification test after updating the zero compensation parameter, then the zero compensation parameter is restored to a state before updating.

10. The method of claim 1, wherein the collected environmental parameter data comprises: temperature, humidity, and atmospheric pressure.

11. A method for adjusting parameters of a vehicle scale having a weighing sensor, wherein a program stored in a memory of the vehicle scale triggers and executes the method, which comprises the steps of:
- collecting environmental parameter data by collecting data of an environment where the vehicle scale is currently located, either during execution of an application by the vehicle scale or of an environment where the vehicle scale is currently located; and
- calculating a zero-compensation parameter of the vehicle scale based on the collected environmental parameter data and updating a stored value of the zero-compensation parameter in the program, wherein the step of calculating and updating the zero compensation parameter is based on either:
  - the environmental parameter data and environmental parameter data at the last update time of the zero compensation parameter; or
  - the environmental parameter data collected within a time interval from the last update of the zero compensation parameter to the triggering of the method.

12. The method of claim 11, wherein the vehicle scale further collects zero information, and the method is terminated when a change between the zero information and zero information upon the last update of the zero compensation parameter of the vehicle scale is within a predetermined threshold.

13. The method of claim 11, wherein the method is terminated when a change in the environmental parameter data collected within the time interval is within a predetermined threshold.

14. The method of claim 11, wherein the method is triggered and executed when the vehicle scale is in an idle state.

15. The method of claim 11, wherein the method is triggered and executed when the vehicle scale is in an idle state and at least one of the following situations occurs:
- the time exceeds a predetermined threshold;
- a change in at least one parameter of the environment where the vehicle scale is located exceeds a predetermined threshold;
- the time passed since the last update of the zero compensation parameter in the vehicle scale exceeds a predetermined threshold; or
- the number of weighing applications executed by the vehicle scale exceeds a predetermined threshold.

16. The method of claim 11, wherein:
- if the vehicle scale fails to perform a performance verification test before updating the zero compensation parameter, then the method is terminated; or,
- if the vehicle scale fails to perform a performance verification test after updating the zero compensation parameter, then the zero compensation parameter is restored to a state before updating.

17. The method of claim 12, wherein:
- if the vehicle scale fails to perform a performance verification test before updating the zero compensation parameter, then the method is terminated; or,
- if the vehicle scale fails to perform a performance verification test after updating the zero compensation parameter, then the zero compensation parameter is restored to a state before updating.

18. The method according to claim 11, wherein the zero compensation parameter of the vehicle scale is calculated and updated based on:
- the environmental parameter data collected during the last execution of the application by the vehicle scale, or
- the environmental parameter data collected during the execution of the application.

19. The method of claim 11, wherein the method is triggered and executed when the vehicle scale is in an idle state and at least one of the following situations occurs:
- the time exceeds a determined threshold;
- a change in any one or more of parameters of the environment where the vehicle scale is located exceeds a predetermined threshold;
- the time passed since the last update of the zero compensation parameter in the vehicle scale exceeds a predetermined threshold;
- the number of times the vehicle scale executes the application exceeds a predetermined threshold.

20. The method of claim 11, wherein the collected environmental parameter data comprises: temperature, humidity, and atmospheric pressure.

* * * * *